United States Patent
Yu et al.

(10) Patent No.: US 8,773,078 B2
(45) Date of Patent: Jul. 8, 2014

(54) UNIVERSAL SERIAL BUS (USB) CHARGING SYSTEM AND METHOD THEREOF

(75) Inventors: Shun-te Yu, Hualien (TW); Wen-ming Huang, Taoyuan (TW); Kuang-hsien Hsu, Taipei (TW); Chieh-shiung Chang, Kaohsiung (TW)

(73) Assignee: Genesys Logic, Inc., Shindian (TW)

( * ) Notice: Subject to any disclaimer, the term of this patent is extended or adjusted under 35 U.S.C. 154(b) by 324 days.

(21) Appl. No.: 12/911,580

(22) Filed: Oct. 25, 2010

(65) Prior Publication Data

US 2011/0273144 A1 Nov. 10, 2011

(30) Foreign Application Priority Data

May 5, 2010 (TW) ............................... 99114375 A

(51) Int. Cl.
*H02J 7/04* (2006.01)

(52) U.S. Cl.
USPC ......................................... 320/162; 320/148

(58) Field of Classification Search
USPC .......................................................... 320/162
See application file for complete search history.

(56) References Cited

U.S. PATENT DOCUMENTS

| 6,798,173 B2* | 9/2004 | Hsu ............................... 320/134 |
| 2008/0042616 A1* | 2/2008 | Monks et al. .................. 320/106 |

FOREIGN PATENT DOCUMENTS

| CN | 1350355 | 5/2002 |
| CN | 101499669 | 8/2009 |

* cited by examiner

*Primary Examiner* — Drew A Dunn
*Assistant Examiner* — Robert Grant

(57) ABSTRACT

A USB charging system and the method thereof are disclosed. The USB charging system includes a hub device having a charging function module and a plurality of connection ports. The charging function module dynamically distributes the charging current to the connection ports based on power supply ability of a power unit for providing the charging current to at least one chargeable device wherein the charging current is greater than USB protocol current.

18 Claims, 4 Drawing Sheets

US 8,773,078 B2

UNIVERSAL SERIAL BUS (USB) CHARGING SYSTEM AND METHOD THEREOF

CLAIM OF PRIORITY

This application claims priority to Taiwanese Patent Application No. 099114375 filed on May 5, 2010.

FIELD OF THE INVENTION

The present invention relates to a universal serial bus (USB) charging system and method thereof, and more particularly to a USB charging system with higher charging current and method thereof.

BACKGROUND OF THE INVENTION

In recent years, the connection ports compatible to universal serial bus (USB) protocol are widely applicable to a variety of portable electronic products, such as mobile phones and digital cameras. If there is a need to charge these portable electronic products by power, the charging power is inputted to the portable electronic products via USB connection ports which is adapted to a dedicated charger device or connected to USB ports of the computer system. Based on USB version 2.0, the charging current provided by the USB connection port has a range from 100 milliampere (mA) to 500 mA. When the electronic products are charged by the USB ports of the computer system, only the maximum charging current, i.e. 500 mA, is provided to the electronic products for battery charging, which results in a slow charging status and thus takes a lot of charging time. A part of battery charging standards of portable electronic products allow the computer system and hub to supply higher charging current in order to reduce the charging time of portable electronic products.

However, due to the consideration of production cost, the connection ports having higher power supply ability in the computer system which are provided to the hub are limited and the connection ports are only the specific ports. Therefore, when the portable electronic products are inserted to the connection ports without higher charging current, the portable electronic products cannot be rapidly charged and lack the charging usage flexibility.

To solve the aforementioned problems, an Electrically Erasable Programmable Read-Only Memory (EEPROM) is conventionally proposed to store the arrangement status which indicates the chargeable connection ports in higher charging current. The hub reads the arrangement status in the EEPROM to solve the problem of the charging usage flexibility of the specific ports. However, this case increases the manufacturing cost of the EEPROM.

In another conventional technique, each of connection ports has an additional pin in the hub controller and the hub controller determines whether the connection ports with the pins are the chargeable connection ports based on the higher charging current. However, the size of integrated circuit (IC) is very precise and the occupied area of IC considerably shrinks. As a result, it is quite difficult to add pins on the IC and the manufacturing cost is increased even if the pins are added.

Consequently, there is a need to develop a charging system with higher charging current for the portable electronic products to solve the aforementioned problems.

SUMMARY OF THE INVENTION

One objective of the present invention is to provide a universal serial bus (USB) charging system and method thereof for reducing the cost of additional components and fir dynamically selecting the connection ports of the hub device.

The present invention sets forth a USB charging system and method thereof. The USB charging system includes a power unit and a hub device. The hub device connected to the power unit, charging at least one chargeable device. The hub device further includes a plurality of connection ports and a charging function module. The connection ports are connected to the at least one chargeable device, respectively.

The charging function module distributes a charging current to the connection ports to allow the power unit to provide the charging current to the at least one chargeable device wherein the charging current is greater than a USB protocol current. The charging function module has a charging ability calculator and a charging port controller. The charging ability calculator calculates a chargeable account based on the charging power of the power unit. The charging port controller dynamically assigning the connection ports to determine whether one of the connection ports is a chargeable port and to determine whether the chargeable port charges the at least one chargeable device based on the chargeable account.

The chargeable account is equal to the quotient value of which the charging power is divided by the charging current. The charging port controller assigns at least one of the connection ports of the at least one chargeable device as either a standard port or a chargeable port based on the chargeable account. The hub device further includes a hub function module to detect whether the connection ports are over-current.

In one preferred embodiment, the universal serial bus (USB) charging method which is suitable for a USB charging system, wherein the USB charging system comprises a power unit and a hub device connected to a USB host, and the hub device has a charging function module and a plurality of connection ports, the USB charging method comprising the step of:

(a) performing an initialization procedure to the plurality of connection ports by the USB charging system for generating a chargeable account;

(b) detecting whether a device is connected to one of the connection ports by the USB charging system, wherein if yes, proceed to step (c) and if no, continuously proceed to step (b) until the device is connected to one of the connection ports;

(c) determining whether the device is a chargeable device by the charging function module, wherein if yes, proceed to step (d) and if no, the charging function module assigns the connection port of the device as a standard port and then proceed to step (d1); and (d) determining whether the chargeable account is zero by the charging function module, wherein if yes, the charging function module assigns the connection port of the device as a standard port and then proceed to step (d1), and if no, the charging function module assigns the connection port of the device as a chargeable port and then proceed to step (d2), wherein the step (d) further comprising the following steps of:

(d1) when the connection port of the device is assigned as the standard port, the charging function module keeping the chargeable account constant and the controlling the power unit to provide an operation current to the device via the connection port for performing a standard USB function wherein the operation current is equal to or smaller than a USB protocol current; and (d2) when the connection port of the device is assigned as the chargeable port, the charging function module making a subtraction of the chargeable account by one and the charging function module controlling the power unit to provide a charging current to the device via the connection port for performing a charging procedure wherein the charging current is greater than the USB protocol current.

After the step (d), further including the steps of:
(e) while performing the charging procedure, detecting whether the connection ports are over-current by the hub device, wherein if yes, the charging function module adds one to the chargeable account and the connection port provides an operation current to the device for performing a standard USB function wherein the operation current is equal to or smaller than a USB protocol current, and if no, proceed to the step (f); and
(f) determining whether the device in the connection port is removed or the charging procedure is completed by the charging function module, wherein if yes, the chargeable account is added by one and return the step (b), and if no, continuously perform the step (f) until the device in the connection port is removed or the charging procedure is completed.

The present invention provides a USB charging system and method thereof for dynamically selecting the chargeable ports of the hub device, solving the problem of the charging usage flexibility of the specific ports and reducing the manufacturing cost of the additional IC components.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
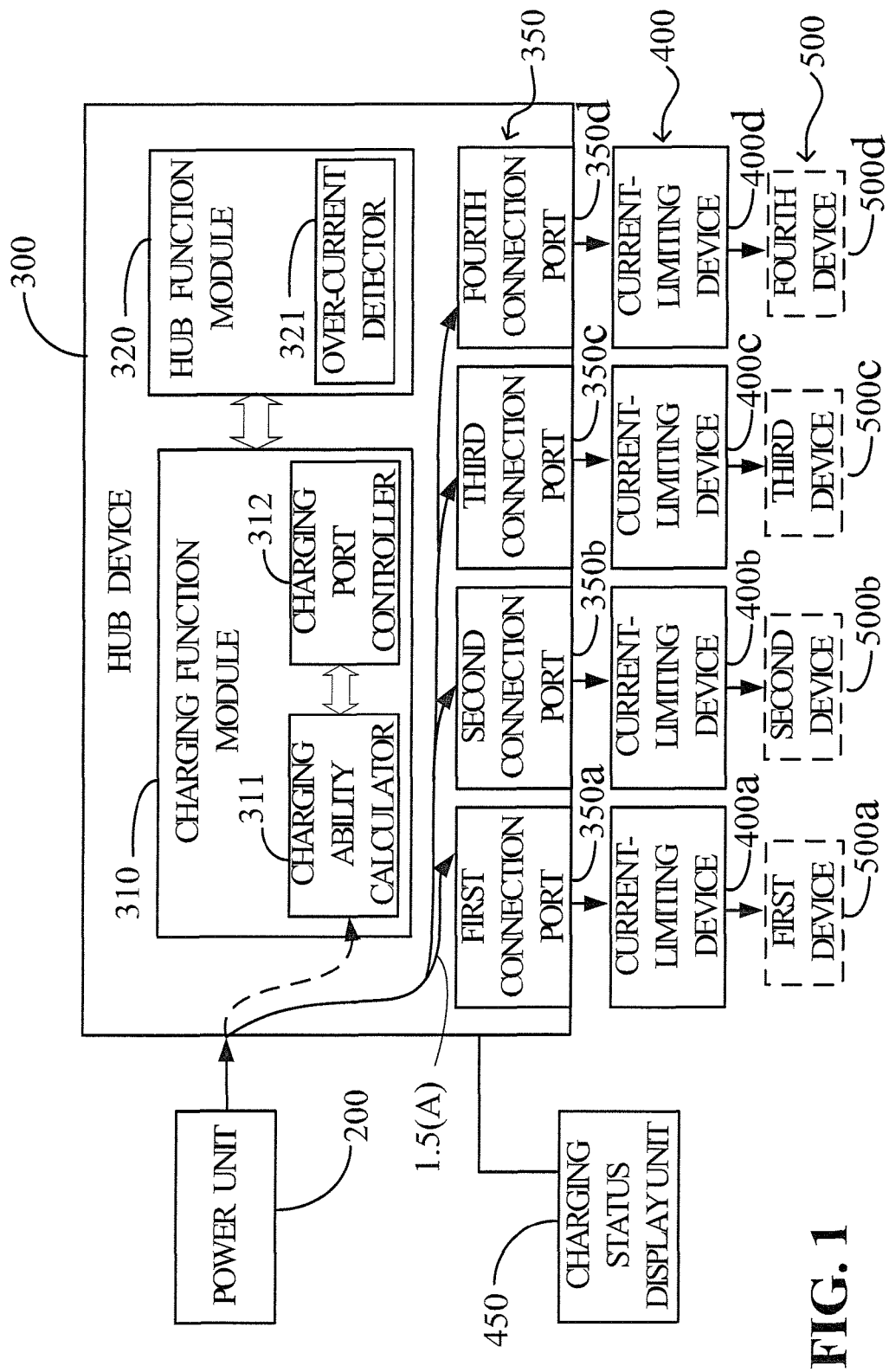
FIG. 1 is a schematic block diagram of a USB charging system according to one preferred embodiment of the present invention.

FIG. 1 is a schematic block diagram of a universal serial bus (USB) charging system 10 according to one preferred embodiment of the present invention. The USB charging system 10 includes a power unit 200, a hub device 300, a current-limiting device 400 and a charging status display unit 450. The power unit 200 provides the charging power, e.g. direct current (DC), to the hub device 300. In one embodiment, the power unit 200 is an external adapter, e.g. AC/DC adapter, for converting the alternating current (AC) type into direct current (DC) type and the DC current is supplied to the hub device 300. In another embodiment, the power unit 200 is disposed in the main circuit board and the power unit 200 is a current conversion component in the main board.

The hub device 300 is connected to the power unit 200 and charges at least one chargeable device 500, e.g. one of the first device 500a, the second device 500b, the third device 500c and the fourth device 500d. The hub device 300 includes a charging function module 310, a hub function module 320 and a plurality of connection ports 350 having the first port 350a through fourth port 350d. The power unit 200 and the power hub device 300 are disposed in the same circuit board. For example, the power unit 200 and the power hub device 300 are disposed in the same main circuit board, but not limited.

In one preferred embodiment, a current-limiting device 400 is disposed between the connection ports 350 and the chargeable devices 500 to prevent the over-current from flowing into the chargeable devices 500 for protecting the chargeable devices 500. For example, the current-limiting device 400 is composed of poly fuse and power switch. In FIG. 1, the first port 350a through the fourth port 350d is correspondingly connected to the current-limiting device 400a through current-limiting device 400d, but not limited. In one embodiment, a plurality of connection ports, e.g. two ports, are connected to one current-limiting device 400. For example, when the charging current is 1.5 A, the maximum limitation current of the current-limiting device 400 is greater than 1.5 ampere (A), e.g. 1.8 A.

In one preferred embodiment, the charging status display unit 450 connected to the hub device 300 is used to display the present charging status. The charging status display unit 450 is composed of light-emitted diode (LED) and a programmable controller is used to control the glittering or luminescence colors for distinguishing the charging status of the chargeable devices 500 connected to the ports 350.

In one embodiment, the hub function module 320 controls the data transmission of the device connected to the hub device 300 based on the USB protocol. The hub function module 320 includes an over-current detector 321 corresponding to the current-limiting device 400 for detecting whether the current flowing into the device exceeds the current limitation of the current-limiting device 400. Alternatively, the hub function module 320 may be a USB compound device, e.g. a compound device which integrates a specific function to a hub.

The connection ports 350 are disposed in the hub device 300 for connecting the hub device 300 to the chargeable devices 500 correspondingly. The connection ports 350 are grouped into "standard port" and "chargeable port" based on the charging current magnitude wherein the standard port provides the USB protocol current and the chargeable port provides the current which is more than the USB protocol current for rapidly charging the chargeable devices 500 in a higher charging current. In FIG. 1, the hub device 300 has the first connection port 350a through the fourth connection port 350d, but not limited.

The USB protocol current follows the standard current announced by the USB Implementers Forum, Inc. For example, regarding to the standard current of USB version 2.0, the standard current is averagely 2.5 mA if the device in the bus is suspended, the standard current is averagely 100 mA if the device in the bus is not suspended and not configured, and the standard current is averagely 500 mA if the device in the bus is not suspended and configured. Regarding to the standard current of USB version 3.0, the standard current is averagely 2.5 mA if the device in the bus is suspended, the standard current is averagely 150 mA if the device is a Low Power Device under Super Speed mode, and the standard current is averagely 900 mA if the device is a High Power Device under Super Speed mode.

The charging function module 310 is disposed in the hub device 300. The charging function module 310 distributes the charging current to the chargeable devices 500 for rapidly charging based on the power supply ability of the power unit 200 wherein the charging current is greater than the USB protocol current.

The charging function module 310 further includes a charging ability calculator 311 and a charging port controller 312. The charging ability calculator 311 is used to evaluate the current magnitude from the power unit 200 for computing the multiples or times of charging current provided to a chargeable device 500. That is, the charging ability calculator 311 computes that how many the charging current counts are provided to the connection ports 350 wherein the charging current is greater than the USB protocol current. For example, when the charging current 1.5 A is supplied to a connection port, i.e. a chargeable port and the total power supply current is 4.5 A, the charging ability calculator 311 can provides three connection ports for charging because 4.5 A divided by 1.5 A equals 3. The amount of three connection ports is termed as chargeable account. It should be noted that the charging current 1.5 A is greater than the USB protocol current, 500 mA which is the maximum limitation current in USB version 2.0.

Additionally, the charging port controller 312 controls the connection ports 350 to start the chargeable function detection for determining whether the devices connected to the connection ports 350 are chargeable devices 500. Moreover, the charging port controller 312 allots the charging power resource to determine whether the chargeable device 500 connected to the connection port is provided by the charging power resource. The connection ports 350 have the allotted charging current which is greater the USB protocol current and the connection ports connected to the chargeable device 500 can be freely selected but not specific ports. Therefore, the charging port controller 312 is capable of dynamically assigning the connection ports 350 to be the chargeable ports. That is, the charging port controller 312 can dynamically switches the connection ports 350 to select the connection ports 350 as the chargeable ports. In FIG. 1, when the first device 500a is connected to the first connection port 350a via the current-limiting device 400a, the first connection port 350a is regarded as a chargeable port and the charging port controller 312 distributes the charging current to the first connection port 350a for charging the chargeable device 500 wherein the charging current is greater than the USB protocol current.

The operation of USB charging system is described as follows.

The charging port controller 312 assigns the connection port 350 of the device to be either a standard port or a chargeable port based on the chargeable account. For example, the charging port controller 312 determines whether the chargeable account is zero. If yes, the charging port controller 312 assigns the connection port 350 of the device to be a standard port. If no, the charging port controller 312 assigns the connection port 350 of the device to be a chargeable port.

When performing a charging procedure, the over-current detector 321 of the hub function module 320 determines whether the connection 350 exceeds the limitation current. If yes, the charging port controller 312 adds one to the chargeable account and the connection port 350 provides the operation current to the device wherein the operation current is equal to or smaller than the USB protocol current. If no, the connection port 350 continuously charges the device. The over-current means that the over-current detector 321 detects whether the operation current exceeds the limitation current of the current-limiting device 400.

After continuously charging the device, the charging port controller 312 further determines whether the device is removed or completes the charging procedure. If yes, the chargeable account is added one and the charging procedure is completed. If no, the device is continuously charged until the device is removed or the charging procedure is completed.

When the charging port controller 312 determines the chargeable port amount by dynamically selecting the connection ports 350, the chargeable port amount is either equal to or unequal to the chargeable account. Similarly, when the charging port controller 312 starts the chargeable function detection for determining the amount of the starting chargeable ports, the starting chargeable ports amount is either equal to or unequal to the chargeable account. For example, if the chargeable account is two, however, the charging port controller 312 is able to assign two of four connection ports 350, i.e. first connection port 350a through fourth connection port 350d, as the chargeable ports. Therefore, the charging port controller 312 starts the chargeable function detection of the first connection port 350a through fourth connection port 350d to determine whether the devices are connected to the connection ports 350 wherein two of four connection ports 350 are dynamically assigned as the chargeable ports.

Figure 2:
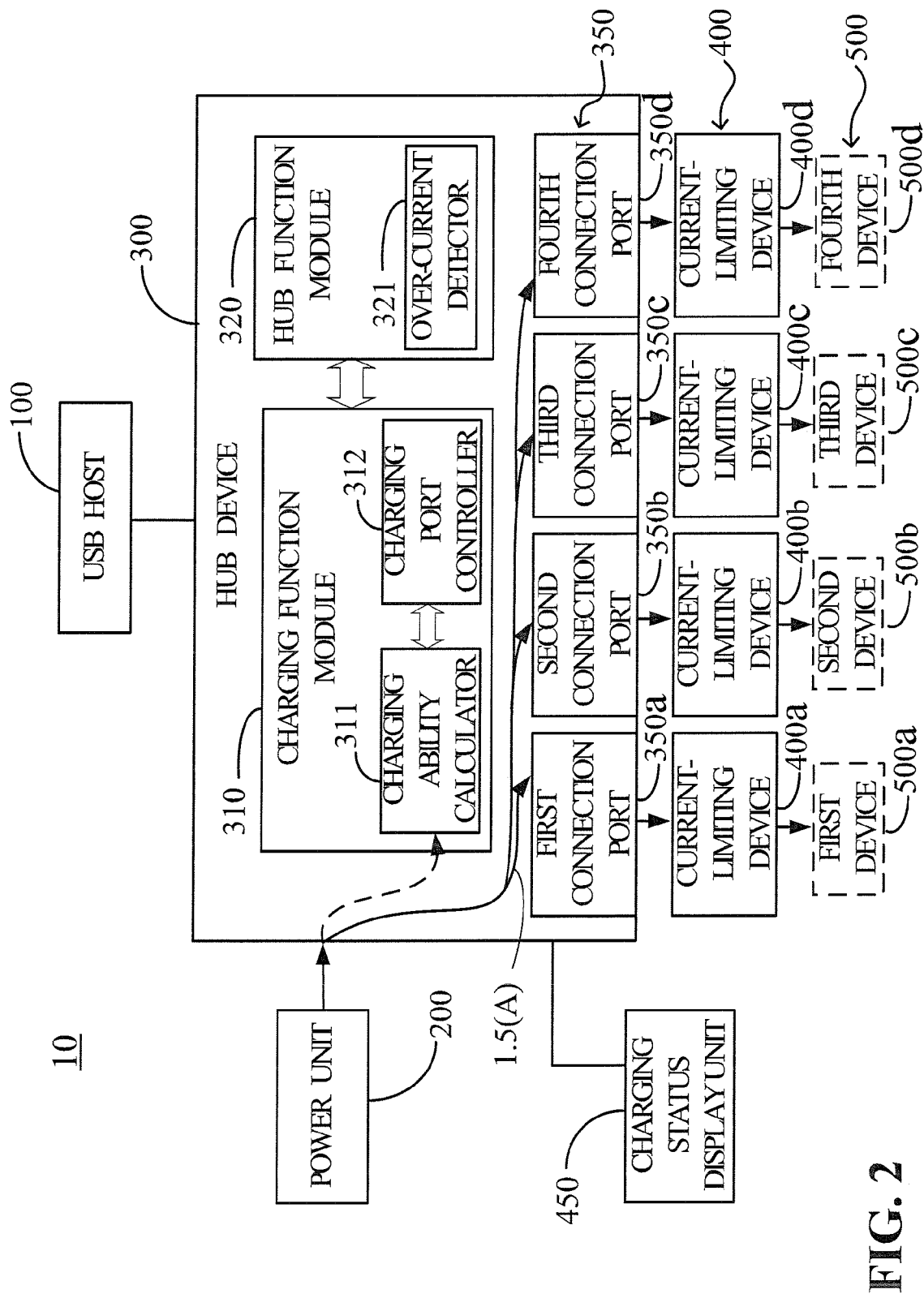
FIG. 2 is a schematic block diagram of a USB charging system according to another preferred embodiment of the present invention.

FIG. 2 is a schematic block diagram of a USB charging system 10 according to another preferred embodiment of the present invention. The USB charging system 10 includes a power unit 200, a hub device 300, a current-limiting device 400, a charging status display unit 450 and a USB host 100. The USB host 100 is disposed in computer system (not shown) and performs the controls of data transmission timing and data transmission direction in the USB protocol. The hub device 300 is connected to the USB host 100 via the port (not shown).

The USB host 100 performs a charging initialization procedure of the USB charging system 10. The USB host 100, power unit 200 and hub device 300 are disposed in the same circuit board. For example, the power unit 200 and hub device 300 are disposed in the USB host 100, but not limited. The rest components are the same as the components shown in FIG. 1 and the detail descriptions are omitted here.

The USB charging system 10 in the present invention utilizes the charging function module 310 of the hub device 300 distributes the charging current to the chargeable devices 500 based on the power supply ability of power unit 200 wherein the charging current is greater than the USB protocol current. The USB charging system 10 can solve the problem of the charging usage flexibility of the specific ports, reduce the manufacturing cost of the EEPROM, and solve the problem of the occupied area of IC chip.

Figure 3:
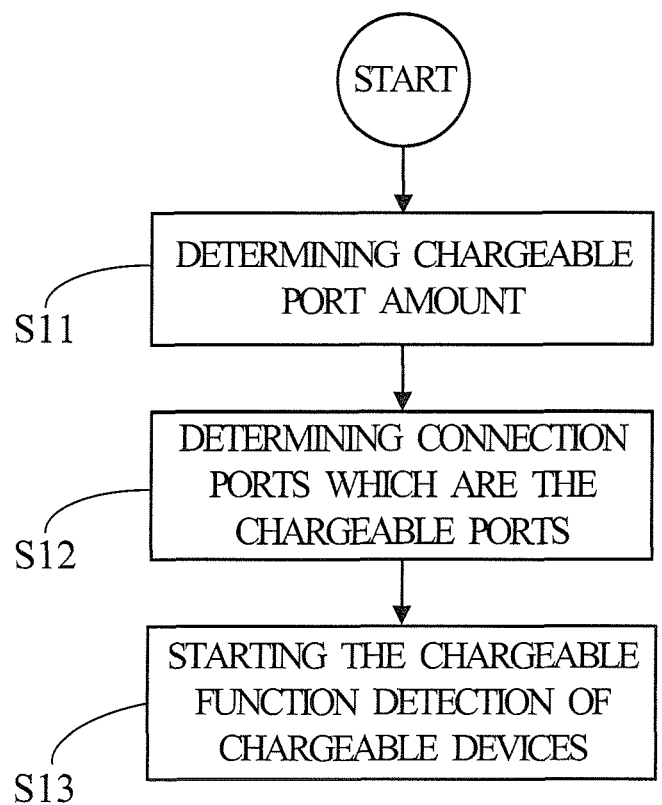
FIG. 3 is a flow chart of an initialization procedure of USB charging method according to one preferred embodiment of the present invention.

The USB charging method is performed by the USB charging system 10. Please refer to FIG. 1 and FIG. 3. FIG. 3 is a flow chart of an initialization procedure of USB charging method according to one preferred embodiment of the present invention. The initialization procedure of USB charging method means that the charging function module 310 performs initialization steps for the connection ports 350 to generate the chargeable account.

In step S11, the charging ability calculator 311 of the charging function module 310 determines the chargeable port amount of the hub device 300 for generating a chargeable account. The chargeable account indicates the connection port amount which can be charged in a predetermined charging current, e.g. 1.5 A. If the power supply ability of power unit 200 is 4.8 A and the charging current is 1.5 A, the chargeable account computed by the charging ability calculator 311 is three. That is, the hub device 300 provides three ports, i.e. three chargeable ports, for rapidly charging the device. After the charging ability calculator 311 generates the chargeable account, the charging ability calculator 311 and the charging port controller 312 do addition and subtraction operations of the chargeable account based on the usage statuses of the chargeable ports.

In step S12, the charging port controller 312 of the charging function module 310 determines the connection ports which are the chargeable ports. In other words, the charging port controller 312 dynamically assigns the connection ports as the chargeable ports. For example, if the hub device 300 has four connection ports and the chargeable account is three, the first, second and fourth connection ports are assigned to be "chargeable ports" and the third connection port is assigned as standard port.

When the charging port controller 312 determines the chargeable port amount by dynamically selecting the connection ports 350, the chargeable port amount is either equal to or unequal to the chargeable account. For example, if the chargeable account is three, three of the first connection port 350a through the fourth connection port 350d can be assigned as the chargeable port. That is, the assignment range of the chargeable port of the charging port controller 312 is four connection ports.

In step S13, the charging port controller 312 of the charging function module 310 starts the chargeable function detection for determining whether the devices connected to the connection ports 350 are chargeable devices 500. For example, the charging port controller 312 starts the chargeable function detection of the chargeable devices 500 in the first connection port 350a, second connection port 350b and fourth connection port 350d and stops the chargeable function detection of the chargeable device 500 in the third connection port 350c. When the chargeable device connected to the chargeable port is detected, the charging port controller 312 performs the handshaking procedure with the chargeable device 500, and the charging port controller 312 acknowledges the chargeable device 500 that the detected connection port corresponding to the chargeable device 500 supports the higher charging current.

When the charging port controller 312 determines the chargeable port amount of the chargeable function detection, the chargeable port amount is either equal to or unequal to the chargeable account. When the assignment range of the chargeable port is four connection ports in step S12 and the chargeable account is three, the chargeable port amount is three. However, the charging port controller 312 can advantageously start the chargeable function detection of the first connection port 350a through the fourth connection port 350d. The chargeable device 500 is acknowledged that the detected connection port, i.e. chargeable port, corresponding to the chargeable device 500 supports the higher charging current.

Please refer to FIG. 2 and FIG. 3. Beside the charging function module 310 performs the initialization procedure, the application program of the USB host 100 can perform the initialization procedure. In another preferred embodiment, an initialization procedure of USB charging method is described.

In step S11, the application program of the USB host 100 determines the chargeable port amount of the hub device 300 for generating a chargeable account. The chargeable account of the application program is limited by the chargeable account, e.g. two, of the charging ability calculator 311.

In step S12, the application program of the USB host 100 determines the connection ports which are the chargeable ports. For example, the first connection port 350a and the second connection port 350b are assigned as the chargeable ports.

The assigned connection port amount which represents the number of chargeable ports is either equal to or unequal to the chargeable account. For example, the chargeable account is two in step S11. In step S12, the application program of the USB host 100 selects the second connection port 350b the third connection port 350c and the fourth connection port 350d as the chargeable ports.

In step S13, the charging port controller 312 of the charging function module 310 starts the chargeable function detection for determining whether the devices connected to the connection ports 350 are chargeable devices 500. Similarly, when the second connection port 350b the third connection port 350c and the fourth connection port 350d are assigned as the chargeable ports and the chargeable account is two which represents two chargeable ports, the charging port controller 312 starts the chargeable function detection for determining whether the devices connected to the connection ports 350 are chargeable devices 500.

Figure 4:
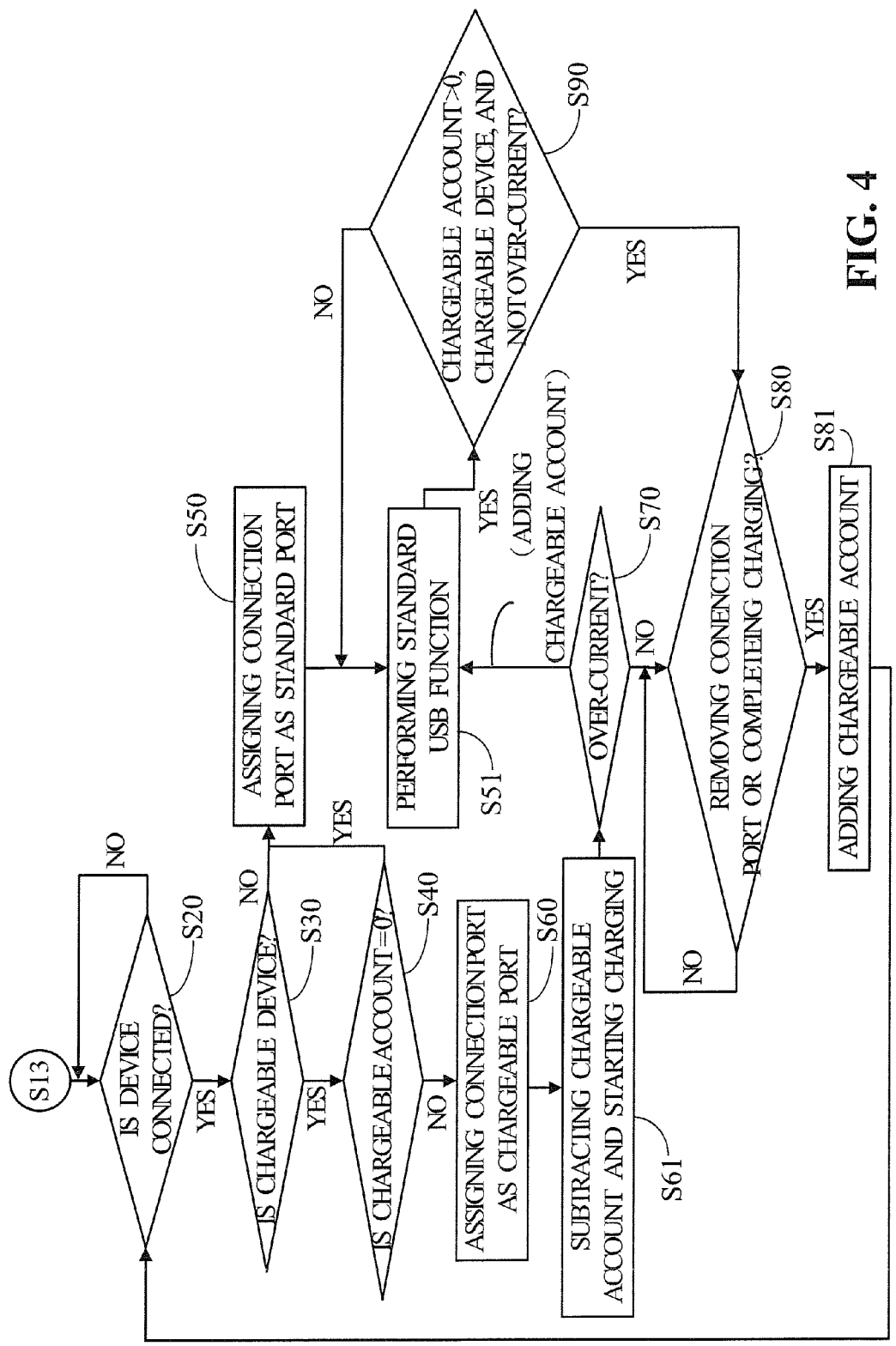
FIG. 4 is a flow chart of USB charging method according to one preferred embodiment of the present invention.

Please refer to FIG. 1, FIG. 2 and FIG. 4. FIG. 4 is a flow chart of USB charging method according to one preferred embodiment of the present invention. After performing the initialization procedure in FIG. 3, the steps in FIG. 4 are performed. For example, the first connection port 350a, the second connection port 350b and the fourth connection port 350d are the chargeable ports and the USB charging method includes the following steps.

In step S20, the charging port controller 312 of the charging function module 310 detects whether a device is connected to one of the chargeable ports. If yes, proceed to step S30. If no, proceed to step S20 until a device connected to one of the chargeable ports is detected and then proceed to step S30. For example, the first device 500a is connected to one of the first connection port 350a, the second connection port 350b and the fourth connection port 350d. Additionally, when the first device 500a is connected to the third connection port 350c, the third connection port 350c is directly assigned as standard port.

In step S30, the charging port controller 312 of the charging function module 310 determines whether a device is a chargeable device 500. If yes, proceed to step S30. If no, proceed to step S50 to assign the connection port as standard port and then proceed to step S51. For example, when the first device 500a and the second device 500b are connected to the first connection port and the second connection port, respectively, the charging port controller 312 detects the first device 500a and the second device 500b to be chargeable device.

Specifically, the charging port controller 312 determines whether the device in the connection port is chargeable device 500 and makes a handshaking procedure with the chargeable device 500. The method of detecting whether the first device 500a in the connection port is chargeable device 500 is referred to Batter Charging Specification (Revision 1.1, Apr. 15, 2009) of USB Implementers Forum, Inc.

In step S40, the charging port controller 312 of the charging function module 310 determines whether the chargeable account is zero. If yes, proceed to step S50 to assign the connection port as standard port and then proceed to step S51. If no, proceed to step S60 to assign the connection port as chargeable port and then proceed to step S61.

In the present invention, the chargeable account "0" mean that the charging power resource runs out and the units of addition and subtraction operations of the chargeable account is one. For example, if the chargeable account is two, the first device 500a and the second device 500b are chargeable device. After the first connection port 350a and the second connection port 350b occupy one of the chargeable account, respectively, the chargeable account is zero.

In step S50, the connection port 350 is assigned as standard port. When the connection port is assigned as standard port so that the charging port controller 312 keeps the chargeable account constant, the charging function module 310 controls the power unit 200 to provide the charging current to the device, e.g. fourth device 350d, and proceed to step S51 to perform the standard USB function wherein the charging current is greater than the USB protocol current. That is, the standard port cannot provide higher charging current than the USB protocol current and the standard USB function is an operation mode which has lower charging current than the USB protocol current.

In step S60, when the connection port is assigned as chargeable port, proceed to step S61 and the charging port controller 312 subtracts one from the chargeable account. The charging function module 310 controls the power unit 200 to provide the charging current to the device, e.g. the first device 500a, via the connection port 350 wherein the charging current is greater than the USB protocol current.

The chargeable port is a connection port 350 which provides higher charging current. In one embodiment, the higher charging current is 1.5 A. Furthermore, the connection port 350 can be assigned as the dedicated charging port. In step S40, the charging status display unit 450 is activated to identify the charging state.

In step S70, while starting a charging procedure, the over-current detector 321 of the hub function module 320 determines whether the device, e.g. first device 500a, is over-current. If yes, proceed to step S51. The charging port controller 312 adds one to the chargeable account and the connection port 350 provides the charging current to the device, e.g. first device 500a to perform the standard USB function. If no, proceed to step S80. The over-current means that the chargeable device 500 reports an over-current signal to the USB host 100 and the device cannot allow to receive the over-current when the chargeable device 500 receives the charging current which is greater than the USB protocol current. Alternatively, the over-current detector 321 determines whether the charging current exceeds the limitation current of the current-limiting device 400.

It should be noted that the over-current detector 321 is corresponding to the current-limiting device 400 to continuously detect the over-current. When the current-limiting device 400 does not allow the over-current to flow into the device, the device informs the over-current detector 321 of the over-current so that the charging port controller 312 stops the connection port 350 to protect the hub device 300. In the over-current status, the charging port controller 312 firstly stops the connection port 350 and then automatically or manually re-starts the connection port 350 to assign the connection port 350 as standard port as if the connection port is not assigned as the chargeable port during the initialization procedure. It is necessary to re-starts the hub device 300 for assigning the connection port as the chargeable port and for setting the hub device 300 by either the initialization procedure or the USB host 100.

In step S80, the charging port controller 312 of the charging function module 310 determines whether the device, e.g. first device 500a, in the connection port is removed or the charging procedure is completed. If yes, proceed to step S81. The chargeable account is added by one and the charging procedure returns to step S20 for detecting whether a device is connected to one of the chargeable ports. If no, proceed to step S80 until the device, e.g. first device 500a, is removed or the charging procedure is completed.

In step S90, when another device is connected to another chargeable port and the connection port of the another device is assign as standard port, the charging port controller 312 determines whether the chargeable account is greater than zero and determines whether the another device is a chargeable device, and the over-current detector 321 determines whether the connection port of the another device is not over-current. If all of the decisions are yes, i.e. the chargeable account is greater than zero, the another device is a chargeable device, and the connection port of the another device is not over-current, proceed to step S80. If at least one of the three decisions is no, the another device is continuously assigned as standard port to perform the standard USB function. For example, the another device is the fourth device 500d connected to the fourth connection port 350d. After the charging procedure of the second device 500b is completed, the chargeable account is added by one. When the fourth connection port 350d is further changed from standard port to chargeable port and is not over-current, proceed to step S80.

According to the above-mentioned descriptions, the present invention provides a USB charging system and method thereof. The charging function module of the hub device in the USB charging system distributes the charging current to the chargeable device based on the power supply ability of power unit wherein the charging current is greater than the USB protocol current. The USB charging system 10 and method thereof can solve the problem of the charging usage flexibility of the specific ports, reduce the manufacturing cost of the EEPROM, and solve the problem of the occupied area of IC chip. Moreover, the USB charging method can dynamically selects the chargeable ports of the hub device.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A universal serial bus (USB) charging system, comprising:
    a power unit, providing a charging power; and
    a hub device connected to the power unit, charging at least one chargeable device, the hub device comprising:
        a plurality of connection ports connected to the at least one chargeable device; and
        a charging function module coupled to the power unit, distributing a charging current to the connection ports to allow the power unit to provide the charging current to the at least one chargeable device wherein the charging current is greater than a USB protocol current, the charging function module comprising:
            a charging ability calculator, calculating a chargeable account based on the charging power of the power unit; and
            a charging port controller, dynamically assigning the connection ports to determine whether one of the connection ports is a chargeable port and to determine whether the chargeable port charges the at least one chargeable device based on the chargeable account;
        wherein when a charging procedure of the charging system is performed, the hub device detects whether the connection ports are over-current, and if yes, the charging function module adds one to the chargeable account and the connection port provides an operation current to a device for performing a standard USB function wherein the operation current is equal to or smaller than a USB protocol current.

2. The USB charging system of claim 1, wherein the chargeable account is equal to the quotient value of which the charging power is divided by the charging current.

3. The USB charging system of claim 1, wherein the charging port controller assigns at least one of the connection ports of the at least one chargeable device as either a standard port or a chargeable port based on the chargeable account.

4. The USB charging system of claim 1, wherein when the charging port controller determines an amount of the chargeable port by dynamically selecting the connection ports, the amount of the chargeable port is either equal to or unequal to the chargeable account.

5. The USB charging system of claim 1, wherein the charging current is 1.5 ampere (A).

6. The USB charging system of claim 1, further comprising a current-limiting device disposed between the connection ports and the at least one chargeable device.

7. The USB charging system of claim 1, further comprising a charging status display unit connected to the hub device for identifying a charging state.

8. The USB charging system of claim 1, wherein if the hub device detects that the connection ports are over-current, determining whether the device in the connection port is removed or the charging procedure is completed by the charging function module, wherein if yes, the chargeable account is added by one, and if no, continuously detects that the connection ports are over-current until the device in the connection port is removed or the charging procedure is completed.

9. A universal serial bus (USB) charging method which is suitable for a USB charging system, wherein the USB charging system comprises a power unit and a hub device connected to a USB host, and the hub device has a charging function module and a plurality of connection ports, the USB charging method comprising the step of:
   (a) performing an initialization procedure to the plurality of connection ports by the USB charging system for generating a chargeable account;
   (b) detecting whether a device is connected to one of the connection ports by the USB charging system, wherein if yes, proceed to step (c) and if no, continuously proceed to step (b) until the device is connected to one of the connection ports;
   (c) determining whether the device is a chargeable device by the charging function module, wherein if yes, proceed to step (d) and if no, the charging function module assigns the connection port of the device as a standard port and then proceed to step (d1); and
   (d) determining whether the chargeable account is zero by the charging function module, wherein if yes, the charging function module assigns the connection port of the device as a standard port and then proceed to step (d1), and if no, the charging function module assigns the connection port of the device as a chargeable port and then proceed to step (d2), wherein the step (d) further comprises the following steps of:
      (d1) when the connection port of the device is assigned as the standard port, the charging function module keeping the chargeable account constant and controlling the power unit to provide an operation current to the device via the connection port for performing a standard USB function wherein the operation current is equal to or smaller than a USB protocol current; and
      (d2) when the connection port of the device is assigned as the chargeable port, the charging function module making a subtraction of the chargeable account by one and the charging function module controlling the power unit to provide a charging current to the device via the connection port for performing a charging procedure wherein the charging current is greater than the USB protocol current; and
   (e) while performing the charging procedure, detecting whether the connection ports are over-current by the hub device, wherein if yes, the charging function module adds one to the chargeable account and the connection port provides an operation current to the device for performing a standard USB function wherein the operation current is equal to or smaller than a USB protocol current.

10. The USB charging method of claim 9, after the step (e), further comprising the step of:
   (f) if detecting that the connection ports are over-current by the hub device during the step (e), determining whether the device in the connection port is removed or the charging procedure is completed by the charging function module, wherein if yes, the chargeable account is added by one and return the step (b), and if no, continuously perform the step (f) until the device in the connection port is removed or the charging procedure is completed.

11. The USB charging method of claim 10, during the step (e), further comprising the step of determining whether the charging current exceeds the limitation current of a current-limiting device of the USB charging system.

12. The USB charging method of claim 9, during the step (a), further comprising the steps of:
   (a1) determining the amount of the chargeable port in the hub device for generating the chargeable account by the charging function module;
   (a2) determining the connection ports which are assigned as the chargeable ports by the charging function module; and
   (a3) starting the chargeable ports for detecting the chargeable ports by the charging function module.

13. The USB charging method of claim 12, wherein during the step (a1), the chargeable account is determined by the charging function module based on the power supply ability of the power unit.

14. The USB charging method of claim 13, the chargeable account is equal to the quotient value of which the charging power is divided by the charging current.

15. The USB charging method of claim 12, wherein when the charging port controller determines an amount of the chargeable port by dynamically selecting the connection ports in the step (a2), the amount of the chargeable port is either equal to or unequal to the chargeable account.

16. The USB charging method of claim 12, wherein when the charging port controller starts an amount of the chargeable port by dynamically selecting the connection ports in the step (a3), the amount of the chargeable port is either equal to or unequal to the chargeable account.

17. The USB charging method of claim 10, wherein when another device is connected to another chargeable port and the connection port of the another device is assign as standard port, the charging port controller determines whether the chargeable account is greater than zero and determines whether the another device is a chargeable device, and the over-current detector determines whether the connection port of the another device is not over-current, wherein if all of the decisions are yes, proceed to the step (f), and if at least one of the three decisions is no, the another device is continuously assigned as standard port to perform the standard USB function.

18. The USB charging method of claim 9, wherein during the step (a), further comprises the steps of:
   (a1) determining the amount of the chargeable port in the hub device for generating the chargeable account by an application program of the USB host;

(a2) determining the connection ports which are assigned as the chargeable ports by the application program of the USB host; and (a3) starting the chargeable ports for detecting the chargeable ports.

* * * * *